(12) United States Patent
Niessner et al.

(10) Patent No.: US 10,047,220 B2
(45) Date of Patent: Aug. 14, 2018

(54) PROCESS FOR THE MANUFACTURING OF ABS-MOLDING COMPOSITIONS

(71) Applicant: INEOS STYROLUTION GROUP GMBH, Frankfurt (DE)

(72) Inventors: Norbert Niessner, Friedelsheim (DE);
Brian Banaszak, Mannheim (DE);
Rudy Verstraeten, Beerse (BE);
Gisbert Michels, Leverkusen (DE);
Wolfgang Fischer, Walldorf (DE);
Christian Ruthard, Mainz (DE);
Ulrich Jansen, Dormagen (DE)

(73) Assignee: INEOS STYROLUTION GROUP GMBH (DE)

( * ) Notice: Subject to any disclaimer, the term of this patent is extended or adjusted under 35 U.S.C. 154(b) by 71 days.

(21) Appl. No.: 14/900,748

(22) PCT Filed: Jul. 1, 2014

(86) PCT No.: PCT/EP2014/063907
§ 371 (c)(1),
(2) Date: Dec. 22, 2015

(87) PCT Pub. No.: WO2015/000873
PCT Pub. Date: Jan. 8, 2015

(65) Prior Publication Data
US 2016/0152813 A1    Jun. 2, 2016

(30) Foreign Application Priority Data

Jul. 2, 2013   (EP) .................................... 13174792
Jul. 5, 2013   (EP) .................................... 13175247

(51) Int. Cl.
| | |
|---|---|
| B29B 7/46 | (2006.01) |
| C08L 25/12 | (2006.01) |
| B29B 7/48 | (2006.01) |
| B29C 47/40 | (2006.01) |
| B29C 47/60 | (2006.01) |
| B29C 47/64 | (2006.01) |
| B29C 47/76 | (2006.01) |
| B29C 47/92 | (2006.01) |
| C08L 55/02 | (2006.01) |
| B29B 7/18 | (2006.01) |

(52) U.S. Cl.
CPC .............. *C08L 25/12* (2013.01); *B29B 7/18* (2013.01); *B29B 7/46* (2013.01); *B29B 7/48* (2013.01); *B29C 47/402* (2013.01); *B29C 47/6056* (2013.01); *B29C 47/64* (2013.01); *B29C 47/761* (2013.01); *B29C 47/92* (2013.01); *C08L 55/02* (2013.01); *B29C 2947/92209* (2013.01); *B29C 2947/92704* (2013.01)

(58) Field of Classification Search
CPC .... B29B 7/48; B29B 7/46; B29B 7/18; C08L 25/12; C08L 55/02
See application file for complete search history.

(56) References Cited

U.S. PATENT DOCUMENTS

| | | | |
|---|---|---|---|
| 2,897,183 A | 7/1959 | Christl et al. | |
| 3,530,094 A | 9/1970 | Schnell et al. | |
| 3,535,280 A | 10/1970 | Schnell et al. | |
| 3,796,677 A | 3/1974 | Laber et al. | |
| 4,362,850 A | 12/1982 | Burk | |
| 4,421,875 A | 12/1983 | McKee et al. | |
| 4,634,734 A | 1/1987 | Hambrecht et al. | |
| 4,788,253 A | 11/1988 | Hambrecht et al. | |
| 4,802,769 A | 2/1989 | Tanaka | |
| 5,057,593 A | 10/1991 | Marshall et al. | |
| 5,135,986 A * | 8/1992 | Mulhaupt ............. | C08F 279/02 525/279 |
| 5,151,026 A | 9/1992 | Andersen et al. | |
| 5,232,649 A | 8/1993 | Andersen et al. | |
| 5,286,801 A | 2/1994 | Besecke et al. | |
| 5,387,650 A | 2/1995 | Baumgartner et al. | |

(Continued)

FOREIGN PATENT DOCUMENTS

| | | |
|---|---|---|
| CA | 1056975 A | 6/1979 |
| DE | 1260135 B | 2/1968 |

(Continued)

OTHER PUBLICATIONS

International Preliminary Report on Patentability in International Application No. PCT/EP2014/063907, dated Oct. 20, 2015.
English Abstract of DE3106959.
English Abstract of DE3149046.
English Abstract of EP0258741.
English Abstract of EP0534235.
English Abstract of JP 01123853.
English Abstract of JP 1202406.

(Continued)

*Primary Examiner* — Jeffrey C Mullis
(74) *Attorney, Agent, or Firm* — J.A. Lindeman & Co., PLLC (57) ABSTRACT

A process for preparing a thermoplastic polymer composition or a thermoplastic polymer blend, comprising: —from 20 to 80% by weight of at least one water-moist elastomer component A containing up to 40%, preferably up to 30% by weight of residual water, —from 20 to 80% by weight of at least one thermoplastic polymer B, —from 0 to 40% by weight of at least one further polymer C, and —from 0 to 60% by weight of additive(s) D, by mixing the elastomer component A with the thermoplastic polymer B and, if present, the further polymer C and, if present, the additive(s) D in an extruder, comprising the steps of precipitating the elastomer component A, and mechanical dewatering of the elastomer component A leads to improved salt-free products.

9 Claims, 1 Drawing Sheet

(56) References Cited

U.S. PATENT DOCUMENTS

| | | |
|---|---|---|
| 5,851,463 A | 12/1998 | Guntherberg et al. |
| 5,889,111 A | 3/1999 | McKee et al. |
| 6,165,399 A | 12/2000 | Guntherberg et al. |
| 2002/0013410 A1* | 1/2002 | Mizuta ............... C08K 5/098 525/63 |
| 2012/0034478 A1 | 2/2012 | Pepers et al. |

FOREIGN PATENT DOCUMENTS

| | | |
|---|---|---|
| DE | 1495730 A1 | 4/1969 |
| DE | 1300266 B | 7/1969 |
| DE | 1579106 A1 | 1/1970 |
| DE | 2037784 A1 | 3/1972 |
| DE | 2427960 B1 | 6/1975 |
| DE | 2610068 A1 | 9/1977 |
| DE | 3106959 A1 | 9/1982 |
| DE | 3149046 A1 | 6/1983 |
| DE | 3149358 A1 | 6/1983 |
| DE | 4443886 A1 | 6/1996 |
| DE | 9421779 U1 | 1/1997 |
| EP | 062901 A2 | 10/1982 |
| EP | 0233371 A2 | 8/1987 |
| EP | 0258741 A2 | 3/1988 |
| EP | 0477764 A2 | 4/1992 |
| EP | 0512333 A1 | 11/1992 |
| EP | 0534235 A1 | 3/1993 |
| EP | 0735077 A1 | 3/1996 |
| GB | 1124911 A | 8/1968 |
| GB | 1570404 A | 7/1980 |
| JP | 57167303 A | 10/1982 |
| JP | 01123853 A | 5/1989 |
| JP | 1202406 A | 8/1989 |
| JP | 2286208 A | 11/1990 |

OTHER PUBLICATIONS

English Abstract of JP 57167303.

Kunststoffhandbuch, "Polystyrol," vol. V., Carl-Hanser-Verlag, Munich, 1969, p. 118 seq.; See instant specification at p. 18, lines 13-18.

\* cited by examiner

PROCESS FOR THE MANUFACTURING OF ABS-MOLDING COMPOSITIONS

The present invention relates to a process for the preparation of toughened thermoplastic polymer molding compositions, in particular ABS-molding compositions and of polymer blends.

These thermoplastic polymer compositions to be prepared comprise, or consist of:
- A) from 20 to 80% by weight of at least one water-moist elastomer component A, containing up to 40%, preferably up to 30% by weight of residual water,
- B) from 20 to 80% by weight of at least one thermoplastic polymer B,
- C) from 0 to 40% by weight of at least one further polymer C, and
- D) from 0 to 60% by weight of additive(s) D.

The weight percentages relate to the total weight of the thermoplastic polymer composition, the weight percentage of component (A) relates to the dry weight of the elastomer component.

The compositions are prepared by mixing the elastomer component A with the thermoplastic polymer B and, if present, the further polymer C and, if present, the additive(s) D in an extruder. The process comprises the steps of:
- a) precipitating the elastomer component A, separately or together with parts of one or several other components, in an aqueous precipitation step (I), wherein the aqueous composition used for precipitation contains less than 5.0%, preferably less than 4.0% by weight of salt(s), relating to the dry weight of the elastomer component A
- b) mechanical dewatering of the elastomer component A (V), wherein the components A, B and, if present, C and D are fed into an extruder, which has at least two screws rotating in the same direction or in opposite directions and having a screw diameter Ds, and, in the conveying direction, the extruder is essentially composed of:
  - at least one metering section MS into which elastomer component A is fed to the extruder by a metering device,
  - at least one squeeze section SS which serves for dewatering the elastomer component A and contains at least a first retarding element and at least one dewatering orifice which is present upstream of the first retarding element,
  - at least one feed section FS in which the thermoplastic polymer B is introduced as a melt into the extruder,
  - at least one plastication section PS provided with mixing or kneading elements,
  - at least one last devolatilization section VS which is provided with at least one devolatilization orifice and in which the remaining water is removed as steam, and
  - a discharge zone ZZ, wherein the components C and/or D, if present, are fed to the extruder together or separately from one another.

In one process step, the elastomer component A is precipitated in an aqueous precipitation step (I) with less than 5.0%, preferred less than 4.0% and more preferred less than 3.5% by weight of a salt, relating to the dry weight of the elastomer component A, in the aqueous composition, and then treated in a subsequent sintering step (II) at a temperature from 100° to 125° C., preferred below 120° C., more preferred below 115° C. and often from 100° to 110° C. In a preferred embodiment, the process comprises a step (IV) where component A is washed with water after the sintering step (II). The amount of washing water is >1%, preferred >5%, especially preferred >10% based on the total dry weight (100%) of component A.

The present invention furthermore relates to molding materials prepared by the process and the use of the molding materials for the production of films, fibers and moldings. The present invention also relates to films, fibers and moldings made of the thermoplastic compositions and, if present, other polymer components.

Particulate rubbers which may be grafted or un-grafted are frequently used as elastomer components for toughening thermoplastic polymers or other plastics. Such rubbers, in particular polybutadiene or polyacrylate rubbers, are usually prepared in aqueous systems, for example by emulsion or suspension polymerization. They are preferably used as component A of this invention. The particles formed in the suspension polymerization or precipitated in the emulsion polymerization (for example by adding a coagulating precipitating agent) are often washed with water and dewatered by a suitable dewatering method, such as sieving, pressing out, filtration, decanting, settling out, centrifuging or partial thermal drying, for example by means of a pneumatic dryer. Partial dewatering by spray drying is also possible. Partially dewatered elastomer products are normally obtained. U.S. Pat. No. 6,165,399 describes such a process, however it does not disclose how to minimize the salt concentration coming from the precipitation step (I) of the elastomer component. High salt concentrations are leading to visible "salt specks" in the final thermoplastic polymer composition, in particular in ABS-products.

Frequently used graft rubbers (component A) are polybutadiene rubbers grafted with a styrene/acrylonitrile copolymer (SAN) and poly-n-butyl acrylate rubbers grafted with a SAN-copolymer or rubbers composed of a plurality of graft stages and based on butadiene, styrene, n-butyl acrylate, ethyl hexyl acrylate, methyl methacrylate and/or acrylonitrile.

The residual water content of the rubber obtained after partial dewatering is up to 60%, often up to 40%, frequently between 10 and 30% by weight, and is usually removed by an energy-intensive drying step. The dried rubber obtained as a powder is then incorporated into the thermoplastic component(s) present as powder or granules with melting, the end product being formed. Processes in which rubber polymers and matrix polymers are precipitated and dried together are known. Owing to the content of fine dust, the rubber powder tends to undergo spontaneous ignition during the drying and the incorporation into the thermoplastics.

According to DE-A 20 37 784, partially dewatered graft rubber can be mixed into an SAN-copolymer melt under super-atmospheric pressure and a thermoplastic composition containing this graft rubber can be obtained with evaporation of the water. This process requires a relatively large amount of electrical energy. EP-A 0 534 235 describes a process for the preparation of toughened thermoplastics by incorporating a rubber, subjected to partial mechanical dewatering, into a thermoplastic above the softening point of the thermoplastic, the incorporation being effected in a main extruder and the partial dewatering of the rubber being carried out in a side extruder mounted at the side of the main extruder. The residual water remaining in the rubber is removed as steam during the incorporation, through devolatilization orifices present before and after the feed point. One disadvantage of this process is the necessity of operating two extruders for the preparation of the impact-resistant thermoplastic compositions.

DE 94 21 779 U1 discloses an extruder for compounding moist polymer material, in which washed plastic wastes are pushed into the extruder using a stuffing device (stuffing screw). The water adhering to the chopped plastic pieces is removed through an opening in the extruder, the opening being provided with a screw to retain the plastic.

U.S. Pat. No. 5,151,026 describes an extruder in which comminuted and washed plastics wastes whose water content is up to 50% by weight are dewatered. For this purpose, short sections having a left-handed thread are present in the extruder screw, which otherwise has a right-handed thread in the usual manner. A de-volatilization orifice is present in the region of the left-handed thread sections or immediately before the left-handed threads.

The extruder content is under high pressure (pressure maximum) in this region owing to the retarding effect of the left-handed threads, and the de-volatilization orifice must therefore be closed by means of an extruder which prevents the polymer from emerging. This technically complicated seal is disadvantageous. U.S. Pat. No. 5,232,649 describes the corresponding process.

EP-A 0 233 371 discloses a process for the preparation of a thermoplastic resin, in which the latex of a graft rubber, a water-soluble precipitating agent and an organic solvent are mixed to give a two-phase mixture and the aqueous phase is separated off. The organic phase is devolatilized in an extruder, mixed with the metered melt of a styrene/acrylonitrile copolymer and devolatilized again and the product is discharged. The disadvantages of these expensive processes is that large amounts of water initially have to be used and then removed again, that expensive and rapidly evaporating organic solvents must be handled and that graft rubber particles are increasingly entrained by the outflowing gas during de-volatilization before the addition of the SAN melt.

JP-A 01 123 853 (1989) discloses a process in which the latex of a graft rubber, a water-soluble precipitating agent and an organic chemical are mixed in a kneader, the latex being coagulated. The coagulated latex is separated off in the kneader and is further dewatered and devolatilized in an extruder. The process has the disadvantages that large amounts of liquid have to be handled, with the result that the throughput (amount of product per unit time) is low, that the latex coagulation is part of the process and takes place in a technically complex kneader (instead of, for example, in a simple stirred container), and that the solution of the precipitating agent may cause corrosion in the kneader.

JP-A 22 86 208 (1990) describes a twin-screw extruder for dewatering thermoplastic molding materials, whose screws having a right-handed thread each possess two left-handed thread sections. The water passes in liquid form through "Seiher housings"-sieve-like inserts in the extruder barrel and emerges as steam through de-volatilization orifices. However, the Seiher housings tend to become blocked by emerging polymer material, as described in DE-A 1579106 for the dewatering of synthetic rubber. The preparation of the molding materials is thus susceptible to problems. The extruder must be stopped in order to clean the Seiher housings blocked by outgoing polymer, and the Seiher housings then have to be disassembled, cleaned and reassembled.

These downtimes make processes using Seiher housings uneconomic (short operating times).

JP-A 1-202 406 (1989) likewise describes a process in which moist rubber-like polymers are first partially dewatered in an extruder, in a region provided with Seiher housings, and the remaining water is then removed in one atmospheric and three downstream reduced-pressure devolatilization zones. In addition to the disadvantageous, susceptible Seiher housings, this process also includes an expensive reduced-pressure devolatilization region.

JP-A 57 16 7303 (1982) describes a process in which polymer particles are separated off from their aqueous suspension (slurry) by filtration and are further dewatered in an extruder, the water emerging through Seiher housings. The extruder content is then heated up, melted under pressure, devolatilized twice, mixed with additives and discharged. The main disadvantage of this process is the use of the Seiher housings in the extruder, which readily become blocked, resulting in short operating times.

JP-A 4008 754 describes a process for the preparation of a thermoplastic resin, in which the latex of a diene graft rubber is dewatered in a twin-screw extruder, the water emerging through Seiher housings. The extruder content is then devolatilized and melted, after which a melt of a vinyl polymer is fed to the extruder. This process, too, requires the use of the problematic Seiher housings.

U.S. Pat. No. 4,802,769 describes an extruder in which a slurry of a rubber polymer is processed together with a styrene/acrylonitrile copolymer to give a thermoplastic. The water passes in liquid form through Seiher housings and emerges as steam through a three-stage devolatilization process. In addition to the Seiher housings which become blocked, the disadvantages are that the extruder part provided with Seiher housings is heated and that a multiple pressure build-up due to retarding elements occurs in the devolatilization part, with the result that the polymer material is subjected to high thermal and mechanical stress.

U.S. Pat. No. 6,165,399 describes a process which permits the preparation of an impact-resistant thermoplastic comprising at least one water-moist elastomer component and one or more thermoplastic, brittle polymers in a technically simple manner, as far as possible in one process step. It further describes a process by means of which polymer blends can be prepared in one process step by mixing of the thermoplastic with further polymers. In particular, a process should be provided which has the flexibility to permit the blending of even the most different polymers with one another and also the blending of greatly varying quantity mixing ratios of thermoplastic polymer and elastomer component (giving toughened thermoplastics having the low to very high rubber contents) and which at the same time is reliable in operation. However the document does not disclose how to effectively reduce the salt concentration.

According to this invention, the thermoplastic compositions can be prepared with reduced salt concentration, which have a smooth surface with low amount of visible salt specks. The invention in particular relates to a process which comprises the following steps of:

a) precipitating the elastomer component A, separately or together with parts of one or several other components, in an aqueous precipitation step (I), wherein the aqueous composition used for precipitation contains less than 5.0%, preferably less than 4.0% by weight of salt(s), relating to the dry weight of the elastomer component A, b) mechanical dewatering of the elastomer component A in one or more dewatering steps (V), wherein the components A, B and, if present, C and D are fed into an extruder, which has at least two screws rotating in the same direction or in opposite directions and having a screw diameter Ds, and, in the conveying direction, the extruder is essentially composed of:

at least one metering section MS into which elastomer component A is fed to the extruder by a metering device, at least one squeeze section SS which serves for dewatering the elastomer component A and contains at least a first retarding element and at least one dewatering orifice which is present upstream of the first retarding element, at least one feed section FS in which the thermoplastic polymer B is introduced as a melt into the extruder, at least one plastication section PS provided with mixing or kneading elements, at least one last devolatilization section VS which is provided with at least one devolatilization orifice and in which the remaining water is removed as steam, and a discharge zone ZZ, wherein the components C and/or D, if present, are fed to the extruder together or separately from one another.

In one process step, the elastomer component A is precipitated in an aqueous precipitation step (I) with less than 5.0%, preferred less than 4.0% and more preferred less than 3.5% by dry weight of a salt, relating to the weight of the elastomer component A in the aqueous composition, and then treated in a subsequent sintering step (II) at a temperature from 100° to 125° C., preferred below 120° C., more preferred below 115° C. and often from 100° to 110° C.

In a preferred embodiment, the process comprises a step (IV) where component A is washed with water after the sintering step II. The amount of washing water is >1%, preferred >5%, especially preferred >10% based on the total dry weight (100%) of component A.

The thermoplastic molding materials prepared by the processes, and the use of these molding materials for the production of films, fibers and moldings are also part of the invention.

The extruder normally has at least two screws rotating in the same direction or in opposite directions and having a screw diameter Ds, and, in the conveying direction, the extruder is essentially composed of:

at least one metering section MS into which elastomer component A is fed to the extruder by a metering device, at least one squeeze section SS which serves for dewatering the elastomer component A and contains at least a first retarding element and at least one dewatering orifice which is present upstream of the first retarding element, at least one feed section FS in which the thermoplastic polymer B is introduced as a melt into the extruder, at least one plastication section PS provided with mixing or kneading elements, at least one last devolatilization section VS which is provided with at least one devolatilization orifice and in which the remaining water is removed as steam, and a discharge zone ZZ, wherein the components C and/or D are fed to the extruder together or separately from one another.

Some preferred embodiments of the process steps and the extruder are described in U.S. Pat. No. 6,165,399. In a preferred embodiment, the extruder is a twin-screw extruder. However, it is also possible to use an extruder having three or more screws or an extruder having a main screw of large diameter and, arranged around this, small screws (planetary arrangement). The screws of the extruder, furthermore, preferably rotate in the same direction. However, rotation in opposite directions is also possible. Particular preference is given to a twin-screw extruder having screws rotating in the same direction.

The invention also relates to a process, wherein the elastomer component A is precipitated, separately from the other components, in an aqueous precipitation step (I), using an aqueous precipitation composition containing less than 3.5% by weight of salt(s), relating to the dry weight of the elastomer component A.

The water-moist elastomer component A, containing up to 40% by weight of residual water is, as a rule, a moist solid. It is, for example, a graft rubber which was obtained by emulsion polymerization. In general, a precipitation of the elastomer component is feasible with a bi-valent salt concentration (in a solution of 20% elastomer in water) between 0.3 and 0.7% which corresponds to between 1.5% and 3.5% by weight of salt per elastomer dry weight. Concentrations below these values can be applied e.g. for tri-valent salts.

The component A can equally be precipitated with less than 5.0%, preferred less than 4.0% and especially preferred less than 3.5% by weight of salt, relating to the dry weight of the elastomer component A in the aqueous composition of the precipitation step (I). In a preferred embodiment of the invention, 2.5% by weight of salt relating to the dry weight of the elastomer component A are used. In a further embodiment the aqueous composition for precipitation comprises about 20% by weight solid content, (e.g. 18-22%) wherein the solid is elastomer component A, and about 0.8% by weight of salt, what corresponds to 4% by weight of salt relating to the dry weight of the elastomer component A, in a solution with 20% by weight of solid content.

The invention also relates to a process, wherein the salt used for the precipitation step (I) is chosen from a group comprising anhydrous magnesium sulfate, magnesium sulfate with crystal water, anhydrous aluminium sulfate, aluminium sulfate with crystal water, calcium chloride, magnesium chloride, magnesium hydroxide and bi-valent salts and tri-valent salts, in particular magnesium and calcium, with sulphuric acid and combinations thereof.

The precipitation step (I) is generally feasible with a variety of precipitation agents. The salt used for the precipitation step (I) can preferably be chosen out of the following components: magnesium sulfate, aluminium sulfate (either anhydrous or with crystal water), calcium chloride, magnesium chloride, magnesium hydroxide, but also sulphuric acid, alone or in combination of sulphuric acid with salts.

The invention also relates to a process, wherein the precipitation step I comprises more than one subsequent steps, which differ in at least one of the parameters chosen from a group comprising: salt used for the precipitation, amount of salt and/or acid used for the precipitation, pH-value, temperature, concentration of salt and/or acid used for the precipitation, residence time, vessel size, pressure, stirrer speed, stirrer type.

The invention also relates to a process, wherein sulphuric acid is used for the precipitation step (I). The precipitation step (I) can be in one, or consist of two, three or more subsequent or parallel precipitation steps. For example, in a preferred embodiment, a first precipitation step is used, using one or more precipitation agents (e.g. magnesium sulfate (either anhydrous or with crystal water), aluminum sulfate (either anhydrous or with crystal water), calcium chloride, magnesium chloride, magnesium hydroxide, but also sulphuric acid, alone or in combination of sulphuric acid with salts), followed by one or more further precipitation steps where the single steps differ in at least one of the following parameters: amount of precipitation salt and/or acid, pH value, temperature, concentration of salt and/or acid, residence time, vessel size, pressure, stirrer speed, stirrer type.

The invention also relates to a process, wherein the aqueous precipitation step (I) is directly or indirectly followed by a sintering step (II), wherein the precipitated component A is agglomerated to larger particles, characterized by using a temperature from 100° to 125° C. The invention also relates to a process, wherein the sintering step (II) is characterized by using a temperature from 100° to 115° C. The invention also relates to a process, wherein the sintering step (II) is effectuated at a pressure above atmospheric pressure."

In subsequent sintering step (II) or steps, the precipitated rubber is agglomerated to larger particles, which are suitable for further processing. The sintering step II typically works at pressures above atmospheric pressure, at temperatures below 125° C., preferred below 120° C., especially preferred below 115° C. and in a most preferred embodiment at 110° C. or below, whereas the temperature shall not be lower than 100° C. A preferred residence times for the sintering step for the sintering step is 40 minutes. In general, the residence time for the sintering step is 180 minutes or less, preferably less than 60 min and in preferably from 30 to 40 minutes. The total residence time for the precipitation step and the sintering step is preferably between 45 and 90 minutes, in particular about 60 minutes. In the precipitation step as well as in the sintering step, the water contains preferably between 18% to 22% by weight of solid components, what mainly corresponds to the dry weight of the elastomer component A.

The invention also relates to a process, wherein the elastomer component A is washed directly or indirectly after the sintering step II with an amount of water which corresponds to 1 to 90% by weight of water, relating to the dry weight of the elastomer component A. The invention also relates to a process, wherein the elastomer component A is washed directly or indirectly after the sintering step (II) with an amount of water which corresponds to 10 to 50% by weight of water, relating to the dry weight of the elastomer component A. In a preferred embodiment, the component A is washed with water after the sintering step (II) and during and/or after the centrifugation step (III), whereas the amount of washing water is >1%, preferred >5%, especially preferred >10% based on total 100% dry component A. After the sintering step (II) the sintered rubber is treated in a further step (III) to remove some of the water.

All technically suitable procedures can be used here, such as partial drying or centrifugation. Preferably, one or more centrifugation steps are used. The component A is then partially dewatered to a residual water content of up to 60%, often up to 40% by weight, where the partial dewatering may be effected, for example, by filtration, settling out, pressing out, decanting, centrifuging or thermal drying. The elastomer content A containing residual water is fed to metering section MS of the extruder. The metering section MS usually consists of an automatic metering means and the actual metering orifice (or a plurality of metering orifices). The metering means is in the form of, for example, a conveying screw which conveys or forces the conveyed material into the metering orifice. It is also possible for component A to be metered by suitable gravimetric or volumetric metering means and to be metered under gravity into the feed orifice of the extruder. The component A is drawn in and vented by means of a suitable screw geometry in the metering section MS.

If there are more than one elastomer components A, such as two or three components A, these may be metered together or separately from one another into the same metering orifice or into different metering orifices of the metering section MS.

In a possible embodiment, a vent section VeS is located upstream in the direction opposite the conveying direction of the extruder. Typically, it has one or more vent orifices through which occluded air in the elastomer component can escape.

The compositions often contain a further polymer C, which is different from A and B, and additionally contain one or more additives D. In one embodiment, the component C and/or the component D or proportions of the total added amount of components C and/or D are metered into the vent orifice or into one or more further orifices arranged in the vent section VeS. If both components C and D are fed in, this may be done by feeding said components together through one orifice or through different orifices (one each for C and D).

In another, preferred embodiment, the component C and/or the component D or proportions of the total added amount of components C and/or D are metered into the metering orifice of the metering section MS or into one or more further orifices arranged in the metering section MS. This may also be effected in a further metering section MS' which is downstream of the first metering section MS and for which essentially the statements made in connection with section MS are applicable.

Components C and D can be fed into the metering sections of the extruder, separately from A or together with A in one of the following combinations: A+C+D, A/C+D, A+C/D, A+D/C and A/C/D (where/means separately from, each by means of a separate orifice, and + means together with, through a common orifice).

In both stated embodiments, the metering means for the components C and/or D may be, for example, a conveying screw as in the case of the metering of the elastomer component A, a pump or an extruder, depending on the state of aggregation of C and D.

In the region of the metering sections and—if present—in the vent section VeS, the extruder screws are formed, as a rule, as conventional conveying screws. For the purposes of this application, conventional conveying screws are, for example, elements having an earth mixer profile (completely self-purging), elements having a thrust edge, elements having a trapezoidal profile and elements having a rectangular profile, screw elements having conveying threads of large pitch (pitch larger than the diameter of the screw) in the conveying direction (termed RGS elements) or combinations of these elements, it also being possible for the screws to be equipped with a smaller or larger number of flights compared with the squeeze section SS. Double-flight and single-flight screw elements may also be used together here. The screw elements of the conveying screw may be identical or different in the stated sections; furthermore, they can have identical or different pitches.

The at least one squeeze section SS serves for dewatering the elastomer component A and often contains at least a first retarding element and at least one dewatering orifice which is present upstream of the first retarding element by a distance corresponding to at least one screw diameter Ds.

The water-moist elastomer component is conveyed downstream into the first squeeze section SS. In the first squeeze section SS, a part of the residual water contained in the elastomer component is mechanically removed (squeezing). The material is conveyed against a retarding element which acts as an obstacle and is present, as a rule, at the end of the squeeze section SS. This builds up a pressure, which forces water out of the elastomer component. The pressure can be built up by different arrangements of screw elements, kneading elements or other retarding elements, depending on the Theological behavior of the rubber. In principle, all commercial elements in the apparatus serving for building up the pressure are suitable.

Examples of possible retarding elements are given in U.S. Pat. No. 6,165,399 and are included in this patent. However, contrary to U.S. Pat. No. 6,165,399, the dewatering orifices used can comprise screens or mesh filters, but are not Seiher housings. The temperature of the emerging water is in general from 20 to 95° C., preferably from 25 to 70° C., measured at the outlet orifice.

In the first squeeze section SS, from 10 to 90%, preferably from 20 to 80% by weight of the initially contained residual water are usually removed, depending on the elastomer component and on the residual water content initially present.

To improve the dewatering performance of the first squeeze section SS, it can be advantageous to use retarding elements and/or kneading elements in the metering section MS or between the metering section MS and the first dewatering orifice. The type and number of these retarding and/or kneading elements are selected so that the elastomer component is subjected to a degree of mechanical load, thus changing its nature so that it becomes easier to dewater, but not, or only to a subordinate extent, plasticizing it or causing it to begin to melt, and certainly not melting it completely.

The invention also relates to a process, wherein at least a part of the water emerging from the dewatering orifices is present in the liquid phase. As a rule, the temperature of the water leaving the extruder is from 40 to 130, preferably from 50 to 99° C.

In a preferred embodiment, the water removed in the squeeze sections, including any elastomer particles which it may carry, can be collected and, for example, used in the preparation of components A, B, C and/or D. Thus, the water which is squeezed out may, for example, be used again in the preparation of the elastomer component A or for precipitating the rubber from its latex. This recycling of the water improves the cost-effectiveness and the environmental compatibility of the process, since there is less waste water.

In the feed section FS, the component C and/or the component D or proportions of the total added amount of the components C and/or D may be introduced into the extruder, in addition to the melt of a thermoplastic polymer B. These components may be present as a melt or liquid and in this case are generally metered in by metering means as also used for feeding the melt of the polymer B or, if the component is liquid, by means of a liquid pump. In the case of solid components C and/or D, the metering is usually effected as described in the case of component A.

The components C and D can be fed to the extruder separately from B or together with B, in one of the following combinations: B+C+D, B/C+D, B+C/D, B+D/C and B/C/D (where/means separately from, each by means of a separate orifice, and + means together with, through a common orifice).

The components C and/or D or proportions of the total added amount of the components C and/or D, in un-melted or not completely melted form, may also be fed to feed section FS or the above-described vent and metering sections, VeS and MS, of the extruder by means of a positive metering element. Such a metering element is, for example, an extruder, in particular a twin-screw extruder having intermeshing screws running in opposite directions.

The use of a melt pump, of an extruder (ie. side extruder) or of a metering pump as a metering means for the components C and/or D is preferred.

In a further particular embodiment of the extruder, one or more further plastication sections PS are present before feed section FS in which the melt of the thermoplastic polymer is fed in, ie. behind the last squeeze section SS. In this plastication section PS, the very substantially dewatered elastomer component A', for example the rubber powder, is first homogenized and plasticated alone. The melt of the thermoplastic polymer B and, if required, the components C and/or D are accordingly introduced into a viscous melt of the elastomer component A' in this embodiment. In this case, the plastication section PS downstream of the mixing of melt B and C and/or D serves merely for homogenizing the mixture of the components already present in the plastic state.

The last plastication section PS is followed by one or more devolatilization sections VS, each of which is provided with one or more devolatilization orifices. In the devolatilization sections VS, the remaining residual water which was not mechanically removed in the squeeze sections SS is partially or completely removed. Because the temperatures of the polymer melt are usually above 100° C., the water generally emerges completely as steam. The energy required for evaporating the water has, as a rule, already been introduced into the plastication sections PS. However, it is also possible to supply the energy in a conventional manner by heating the extruder barrel.

The de-volatilization orifices are preferably present at the top of the extruder. However, other arrangements are also possible, cf. the statements made in connection with the position of the feed orifices for the melt of the thermoplastic polymer B, which are also applicable in context for the devolatilization orifices.

A lateral arrangement (on one side or both sides) of the devolatilization orifices is likewise preferred.

The devolatilization orifices may be operated under atmospheric, reduced or superatmospheric pressure, and all devolatilization orifices may have the same pressure or different pressures. In the case of reduced pressure, the absolute pressure is usually from 100 to 500 mbar; in the case of devolatilization under superatmospheric pressure, an absolute pressure of up to 20 bar is generally set. However, it is preferable to operate the devolatilization sections VS under atmospheric pressure.

In a preferred embodiment, the extruder has, between the last devolatilization section VS and the discharge zone ZZ, a further section FxS in which the components C and/or D (or proportions of the total added amount of components C and/or D) are fed to the extruder, either together or separately from one another, by at least one metering means. The further section FxS is accordingly located directly before the discharge zone ZZ.

The last section of the extruder is the discharge zone ZZ. It consists e.g. of a conveying screw and a closed barrel part which is terminated by a defined discharge orifice. The discharge zone ZZ is preferably heated.

In a particular embodiment, instead of the perforated die plate or strip described above, with the otherwise usual combination of extrudate take-off, water bath and granulator, a particular die head with subsequent underwater granulation is used.

In a further particular embodiment, the discharge zone ZZ is provided with an apparatus for filtering the melt emerging from the extruder, said apparatus, viewed in the conveying direction, being present before the die head.

The water content of the emerging polymer (the extrudate moisture content) is as a rule from 0.05 to 1.5% by weight, based on this dry polymer. The temperature of the polymer melt emerging from the discharge orifice is as a rule from 180 to 350° C., depending on the type of polymers used. It is advantageous to hold the temperatures low enough for the thermal stress on the polymer to be as small as possible, without, however, affecting the satisfactory preparation of the desired product.

As is generally known, the various zones of an extruder can be individually heated or cooled in order to establish an optimum temperature profile along the screw axis. Furthermore, it is familiar to a person skilled in the art that the individual sections of the extruder may usually be of different lengths. To achieve particular product properties, it may specifically be useful to cool certain parts of the extruder or to control their temperature so that it diverges from that of the remainder of the extruder.

The temperatures and lengths of the individual sections to be chosen in the specific case differ depending on the chemical and physical properties of the components and their ratios, said properties having been mentioned above by way of example. The same also applies to the screw speed, which may vary within a wide range. A speed of the extruder screws of from 50 to 1200 rpm may be mentioned merely by way of example.

A speed range of from 100 to 700 rpm is preferred. It is advantageous to design and to operate the extruder in such a way that mean shear rates of from 15 to 450 $s^{-1}$ are established in the region of the squeeze sections SS at a screw speed of from 50 to 1200 rpm. Shear rates of from 35 to 260 $s^{-1}$ are advantageously established for the preferred screw speed of from 100 to 700 rpm. However, depending on the type, amount and properties of the components used, it may be advantageous to operate at mean shear rates outside this range.

The extruder screws may be any commercially available screw, for example a screw having an external diameter Ds of from 10 to 1000 mm. The screw diameter Ds which is suitable depends on, for example, the type and amount of the components metered into the extruder. The external diameter Ds of the screw may be constant along the extruder or vary within particular limits.

The invention also relates to a process, wherein the screw elements of the extruder have a flight depth ration $DS_{external}/DS_{internal}$ of from 1.2 to 1.8 and contain 3-flight, 2-flight, and 2-flight high volume elements.

Depending on the type and amounts of the components of the composition, screws having a smaller flight depth or screws having a larger flight depth (ie. Deep-flighted screws) may be used in the extruder. Preference is given to the use of screws having a flight depth ration $DS_{external}/DS_{internal}$ Of from 1.2 to 1.8, preferably from 1.4 to 1.6, and particularly preferably from 1.45 to 1.48. A commercially available embodiment of the extruder which is suitable for the novel process has, for example, a flight depth ratio of 1.55, ie. a large flight depth. In another embodiment, screws having a medium flight depth, particularly those having a flight depth ratio of from 1.4 to 1.48, are used. This embodiment of the extruder is also commercially available and may be advantageous for certain components and certain amounts of the components. Screws with flight depth ratios of more than 2 are also suitable.

In particular, particulate rubbers, such as polybutadiene or acrylate rubbers are used as component A. Those rubbers which have a grafted-on shell comprising other, generally nonelastomeric polymers are particularly preferred. In a preferred embodiment of the invention, the graft rubber types fed to the extruder as partially dewatered material contain up to 50, preferably up to 40% and particularly preferably from 25 to 40, % by weight of residual water relating to the dry weight of the graft rubber.

One embodiment of the invention consists in a process in which elastomer components A used are graft rubbers which have a two-stage or multistage structure and in which the elastomeric base or graft stages are obtained by polymerization of one or more of the monomers butadiene, isoprene, chloroprene, styrene, alkylstyrene, C1-C10-alkyl esters of acrylic acid or of methacrylic acid and small amounts of other monomers, including crosslinking monomers, and in which the hard graft stages are obtained by polymerizing one or more of the monomers styrene, alkylstyrene, acrylonitrile and methyl methacrylate.

Graft particles A of polymers based on butadiene/styrene/acrylonitrile, n-butyl acrylate/styrene/acrylonitrile, butadiene/n-butyl acrylate/styrene/acrylonitrile, n-butyl acrylate/methyl methacrylate, n-butyl acrylate/styrene/methyl methacrylate, butadiene/styrene/acrylonitrile/methyl methacrylate and butadiene/n-butyl acrylate/methyl methacrylate/styrene/acrylonitrile are preferred. Polar monomers carrying up to 10% by weight of functional groups or crosslinking monomers may be present as polymerized units in the core or shell.

In one embodiment, 20 to 80% by weight of styrene/acrylonitrile (SAN) copolymers, copolymers of .alpha.-methylstyrene and acrylonitrile, polystyrene, polymethyl methacrylate, polyvinyl chloride or mixtures of these polymers are used as thermoplastic polymers B. SAN polymers, copolymers of .alpha.-methylstyrene and acrylonitrile, polymethyl methacrylate (PMMA) or mixtures of these polymers are preferred, SAN is particularly preferred.

Polycarbonates, polyalkylene terephthalates, such as polybutylene terephthalate and polyethylene terephthalate, polyoxymethylene, polymethyl methacrylate, polyphenylene sulfide, polysulfones, polyether sulfones and polyamides and mixtures of these thermoplastics may also be used as thermoplastic polymers B. Thermoplastic elastomers, such as thermoplastic polyurethane (TPU), may furthermore be used as polymer B.

Copolymers based on styrene/maleic anhydride, styrene/imidated maleic anhydride, styrene/maleic anhydride/imidated maleic anhydride, styrene/methyl methacrylate/imidated maleic anhydride, styrene/methyl methacrylate, styrene/methyl methacrylate/maleic anhydride, methyl methacrylate/imidated maleic anhydride, styrene/imidated methyl methacrylate, imidated PMMA or mixtures of these polymers may likewise be used as component B.

In all stated thermoplastic polymers B, some or all of the styrene may be replaced by alpha.-methylstyrene or by styrenes alkylated on the nucleus or by acrylonitrile.

Among the last-mentioned polymers B, SAN and copolymers based on alpha-methylstyrene/acrylonitrile, styrene/maleic anhydride, styrene/methyl methacrylate and copolymers containing imidated maleic anhydride are preferred.

Known examples of the elastomer component A are polymers of conjugated dienes, such as butadiene, having an outer graft shell based on a vinylaromatic compound, for example SAN copolymers. Graft rubbers based on crosslinked polymers of C1-C10-alkyl esters of acrylic acid, such as n-butyl acrylate or ethylhexyl acrylate, grafted with polymers based on vinylaromatic compounds, such as SAN copolymers, are also known. Graft rubbers which essentially contain a copolymer of conjugated dienes and C1-C10-alkyl acrylates, for example a butadiene/n-butyl acrylate copolymer, and an outer graft stage comprising SAN copolymer, polystyrene or PMMA are also conventionally used.

The preparation of such graft rubbers by the usual methods, in particular by emulsion or suspension polymerization, is known.

Graft rubbers based on SAN-grafted polybutadiene are described, for example, in EP-A 0 258 741, and those based on SAN-grafted poly-n-butyl acrylate are described in DE-A 1260135 and DE-A 3149358. Further details of SAN-grafted poly(butadiene/n-butyl acrylate) mixed rubbers are given in EP-A 062 901.

In the case of the graft rubbers mentioned in the last paragraph, copolymers of styrene and acrylonitrile are used, for example, as thermoplastic polymers B. They are known and some of them are also commercially available and have, as a rule, a viscosity number VN (determined according to DIN 53 726 at 25° C., 0.5% strength by weight in dimethylformamide) of from 40 to 160 ml/g, corresponding to an average molecular weight Mw of from about 40000 to 2000000.

The thermoplastic polymers B are preferably prepared by continuous mass or solution polymerization, the melt obtained being fed continuously and directly to the extruder, for example by means of a melt pump, if necessary after removal of the solvents. However, preparation by emulsion, suspension or precipitation polymerization is also possible, the polymer being separated from the liquid phase in an additional operation. Details of the preparation processes are described, for example in Kunststoffhandbuch, Editors R. Vieweg and G. Daumiller, Vol. V "Polystyrol", Carl-Hanser-Verlag, Munich, 1969, page 118 et seq.

If the elastomer component A is an SAN-grafted polybutadiene, a molding material known as ABS (acrylonitrile/butadiene/styrene) is formed by incorporating the SAN. If an SAN-grafted alkyl acrylate is used as component A, ASA molding materials (acrylonitrile/styrene/acrylate) are formed.

In another embodiment, graft rubbers having a residual water content of up to 60% by weight and based on polydienes and/or polyalkyl acrylates as well as SAN and/or PMMA are used, said rubbers being composed of more than two graft stages.

Examples of such multistage graft particles are particles which contain a polydiene and/or polyalkyl acrylate as the core, a polystyrene or SAN polymer as the first shell and another SAN polymer having a different styrene:acrylonitrile weight ratio as the second shell, or particles comprising a polystyrene, polymethyl methacrylate or SAN polymer core, a first shell of polydiene and/or polyalkyl acrylate and a second shell of polystyrene, polymethyl methacrylate or SAN polymer. Further examples are graft rubbers comprising a polydiene core, one or more polyalkyl acrylate shells and one or more polymer shells of polystyrene, polymethyl methacrylate or SAN polymer or similarly composed graft rubbers having an acrylate core and polydiene shells.

Copolymers having a multistage core-shell structure of crosslinked alkyl acrylate, styrene and methyl methacrylate and an outer shell of PMMA are also commonly used. Such multistage graft rubbers are described, for example, in German Laid-Open Application DOS 3,149,046. Graft rubbers based on n-butyl acrylate/styrene/methyl methacrylate and having a shell of PMMA are described, for example, in EP-A 512 333, any other prior art composition of such graft rubbers also being possible. Such rubbers are used as impact modifiers for polyvinyl chloride and preferably for impact-resistant PMMA. Once again, the stated SAN copolymers and/or PMMA are used as thermoplastic polymers B. If the elastomer component A is a multishell core/shell polymer based on n-butyl acrylate/methyl methacrylate and the polymer B is PMMA, impact-resistant PMMA is accordingly obtained. In this embodiment too, preferred components B are the stated SAN copolymers, polystyrene and/or PMMA.

The diameter of the particulate graft rubbers A is generally from 0.05 to 20 µm. If these are the generally known graft rubbers of small diameter, the diameter is preferably from 0.08 to 1.5 µm, particularly preferably from 0.1 to 0.8 µm.

In the large-particled graft rubbers prepared for example by means of suspension polymerization, the diameter is preferably from 1.8 to 18 µm, in particular from 2 to 15 µm. Such graft rubbers of large diameter are described, for example, in DE-A 4,443,886.

The particle size distribution of the graft rubber particles may be narrow or broad and may have one maximum (monomodal) or else two maxima (bimodal). Particle size distributions having more than two maxima are also possible.

The components C are further polymers, in particular thermoplastic polymers. Suitable components C are all polymers which were mentioned for the thermoplastic polymer B. If the components B and C are identical, the component C is fed to the extruder at another point than the component B.

If the monomers of which the polymers B and C are composed are identical, the components B and C may differ with respect to the amounts of the monomers—for example the polymers B and C may be styrene/acrylonitrile copolymers which differ in the styrene:acrylonitrile ratio. If the amounts of the monomers are also identical, the polymers B and C may have different average molecular weights Mw (B) and Mw (C), measurable, for example, as different viscosity numbers VN(B) and VN(C).

In addition to the monomers mentioned, inter alia for the component B, i.e. styrene, acrylonitrile, methyl methacrylate and vinyl chloride, the following other compounds may also be used as essential monomers for the preparation of C:
alpha.-methylstyrene and styrenes or alpha-methylstyrenes
  each of which is substituted on the nucleus by C1-C8-
    alkyl
methacrylonitrile
C1-C20-alkyl esters of acrylic acid and of methacrylic acid
maleic acid, maleic anhydride and maleimides
vinyl ethers and vinylformamide.

Polymers based on .alpha.-methylstyrene/acrylonitrile and methyl methacrylate/alkyl acrylate, and copolymers of alkyl esters of acrylic acid or of methacrylic acid and styrene or acrylonitrile or styrene and acrylonitrile are examples of the component C.

Further preferred polymers C are:
styrene/acrylonitrile copolymers having different amounts of the monomers compared with the component B, or different average molecular weights Mw,
copolymers of .alpha.-methylstyrene and acrylonitrile,
polymethyl methacrylates,
polycarbonates,
polybutylene terephthalate and polyethylene terephthalate,
polyamides,
copolymers of at least two of the monomers styrene, methyl methacrylate, maleic anhydride, acrylonitrile and maleimides, for example copolymers of styrene, maleic anhydride and phenylmaleimide, impact-modified polystyrene (HIPS), the rubber component of the HIPS that is used being, in particular, polybutadiene, ABS prepared by means of mass polymerization or solution polymerization, thermoplastic polyurethanes (TPU).

The preparation of these polymers is known to a person skilled in the art and is therefore discussed only briefly below.

Polymethyl methacrylates are to be understood as meaning in particular polymethyl methacrylate (PMMA) and copolymers based on methyl methacrylate with up to 40% by weight of further copolymerizable monomers, as obtainable, for example, under the names Lucryl® from BASF Aktiengesellschaft or Plexiglas® from Rohm GmbH. A copolymer of 98% by weight of methyl methacrylate and 2% by weight of methyl acrylate as a comonomer may be mentioned merely by way of example (Plexiglas® 8N, from Rohm). A copolymer of methyl methacrylate with styrene and maleic anhydride as comonomers is also suitable (Plexiglas® HW55, from Rohm).

Suitable polycarbonates are known per se. They are obtainable by interfacial polycondensation, for example by the processes of DE-B-1 300 266, or by reacting diphenyl carbonate with bisphenols according to the process of DE-A-14 95 730. A preferred bisphenol is 2,2-di(4-hydroxyphenyl)propane, generally referred to as bisphenol A. Instead of bisphenol A, it is also possible to use other aromatic dihydroxy compounds, in particular 2,2-di(4-hydroxyphenyl)pentane, 2,6-dihydroxynaphthalene, 4,4'-dihydroxydiphenyl sulfone, 4,4'-dihydroxydihenyl [sic]ether, 4,4'-dihydroxydiphenyl sulfite, 4,4'-dihydroxydiphenylmethane, 1,1-di(4-hydroxyphenyl)ethane or 4,4'-dihydroxybiphenyl or mixtures of the abovementioned dihydroxy compounds.

Particularly preferred polycarbonates are those based on bisphenol A or on bisphenol A together with up to 30 mol % of the abovementioned aromatic dihydroxy compounds.

Polycarbonates are obtainable, for example, under the trade names Makrolon® (from Bayer), Lexan® (from General Electric), Panlite® (from Tejin) or Calibre® (from Dow). The relative viscosity of these polycarbonates is in general from 1.1 to 1.5, in particular from 1.28 to 1.4 (measured at 25° C. in a 0.5% strength by weight solution in dichloromethane).

Polybutylene terephthalate and polyethylene terephthalate are prepared as a rule in a manner known per se, by condensation of terephthalic acid or esters thereof with butanediol or ethanediol under catalysis. The condensation is advantageously carried out in two stages (precondensation and polycondensation).

Details are to be found, for example, in Ullmann's Encyclopadie der Technischen Chemie, 4th Edition, Volume 19, pages 61-88. Polybutylene terephthalate is commercially available, for example, as Ultradur® (from BASF).

Preferred polyamides are very generally those having an aliphatic semicrystalline or partly aromatic and amorphous structure of any type, and blends thereof. Appropriate products are available, for example, under the trade name Ultramid® (from BASF).

The preparation of rubber-modified, impact-modified polystyrene (HIPS) is known to the person skilled in the art. A polybutadiene rubber is generally dissolved in monomeric styrene and the resultant solution of polybutadiene in styrene is then polymerized.

The polymerization is, for example, carried out in two steps, the step frequently termed prepolymerization being carried out in a first reactor and the subsequent main polymerization in a subsequent reactor. The polymerization initiators used are the usual freeradical generators, but redox systems may also be used. Additionally molecular weight regulators, for example, may be among the ingredients. The preparation is generally carried out either by the continuous solution process (both steps in solution) or batchwise by the process frequently termed the bulk/suspension process (first step in bulk, second step in suspension).

Details may be found, for example, in U.S. Pat. No. 4,362,850 and Ullmanns Encyclopedia of Technical Chemistry, Vol. A21 (2003), p. 644-647. A process for continuous solution polymerization of the ABS is also described in EP-A 477 764.

Polymers prepared by solution polymerization are known per se. Graft polymers consisting of solution ABS generally have a average particle diameter d50 of from 700 to 20,000 nm, preferably from 1000 to 15,000 nm, and are thus markedly larger than ABS graft particles prepared by the emulsion polymerization process which is otherwise usually used or by other polymerization processes.

In the solution polymerization process, in contrast to suspension or emulsion polymerization, both the monomers and the polymers produced from them are dissolved in the selected solvent. Solution ABS is generally prepared in a manner similar to the preparation of rubber-modified, impact-modified polystyrene. A polybutadiene rubber is generally dissolved in a mixture of monomeric styrene and monomeric acrylonitrile, and the resultant solution of polybutadiene in styrene/acrylonitrile is then polymerized. The polymerization is, for example, carried out in two steps, the step frequently termed prepolymerization being carried out in a first reactor and the subsequent main polymerization in a subsequent reactor. The polymerization initiators used are the usual freeradical generators, but redox systems may also be used. Additionally molecular weight regulators, for example, may be among the ingredients. The preparation is generally carried out either by the continuous solution process (both steps in solution) or batchwise by the process frequently termed the bulk/suspension process (first step in bulk, second step in suspension). Details may be found, for example, in U.S. Pat. No. 4,362,850 and Ullmanns Encyclopedia of Technical Chemistry, Vol. A21, p. 644-647. A process for continuous solution polymerization of the ABS is also described in EP-A 0 477 764.

Thermoplastic polyurethanes are usually prepared by reacting organic, preferably aromatic, diisocyanates, such as diphenylmethane 4,4'-diisocyanate, with polyhydroxy compounds which are preferably essentially linear, for example polyetherols, or polyesterols, such as polyalkylene glycol polyadipates, and diols acting as chain extenders, such as butane-1,4-diol, in the presence of catalysts, for example tertiary amines (such as triethylamine) or organic metal compounds.

Component C may furthermore essentially comprise copolymers of C2-C8-alkenes, such as ethylene, propene and butene with:
vinylaromatics,
polar comonomers, such as acrylic acid and methacrylic acid, the C1-C10-alkyl esters of acrylic acid and of methacrylic acid,
other mono- or polyfunctional ethylenically unsaturated acids, such as maleic acid, maleic anhydride, fumaric acid, itaconic acid and esters thereof, in particular glycidyl esters, esters with C1-C8-alkanols and esters with aryl-substituted C1-C8-alkanols, carbon monoxide,
nonaromatic vinyl compounds, such as vinyl acetate, vinyl propionate and vinyl alkyl ethers, basic monomers, such as hydroxyethyl acrylate, dimethylaminoethyl acrylate, vinylcarbazole, vinylaniline, vinylcaprolactam, vinylpyrrolidone, vinylimidazole and vinylformamide,
acrylonitrile, methacrylonitrile,
which are prepared in a generally known manner.

In a preferred embodiment, a polymer C which can be prepared from 40-75% by weight of ethylene, 5-20% by weight of carbon monoxide and 20-40% by weight of n-butyl acrylate is used (commercially available as Elvaloy® HP-4051 (from DuPont), or a polymer which can be prepared from 50-98.9% by weight of ethylene, 1-45% by weight of n-butyl acrylate and 0.1-20% by weight of one or more compounds selected from the group consisting of acrylic acid, methacrylic acid and maleic anhydride. The preparation of the last-mentioned embodiments is usually carried out by free radical polymerization and is described in U.S. Pat. No. 2,897,183 and U.S. Pat. No. 5,057,593.

Copolymers of butadiene (or substituted butadienes) with comonomers, preferably, for instance, styrene, methyl methacrylate or acrylonitrile are also suitable, for example nitrile rubber (NBR) or styrene/butadiene rubber (SBR). Some or all of the olefinic double bonds in these copolymers may have been hydrogenated.

Other suitable components C are butadiene/styrene copolymers which have block structures and are nonhydrogenated, hydrogenated or partially hydrogenated. They are preferably prepared by the method of anionic polymerization in solution using organo-metallic compounds, such as sec-butyllithium, linear block rubbers being formed, for example those having the structure styrene/butadiene (two-block) or styrene/butadiene/styrene (three-block). These blocks may be separated from one another by polymers having a random distribution, and furthermore the blocks may also contain minor amounts of units of the respective other monomers.

The presence of small amounts of an ether, in particular tetrahydrofuran (THF), in addition to the initiator, results in the formation of polymer chains which, starting from a butadiene-rich initial segment, have an increasing styrene content along the chain and finally end in a homopolystyrene terminal segment. Details of the preparation process are described in DE-A 31 06 959. Polymers C which have such a composition may be hydrogenated or partially hydrogenated are also suitable.

Other suitable components C are polymers having a star-like structure which are obtained by linking a plurality of polymer chains, mainly three-block polymers of the type styrene/butadiene/styrene, via polyfunctional molecules. Suitable linking agents are, for example, polyepoxides, for example epoxidated linseed oil, polyisocyanates, such as 1,2,4-triisocyanatobenzene, polyketones, such as 1,3,6-hexanetrione, and polyanhydrides, as well as dicarboxylic esters, such as diethyl adipate, and silicon halides, such as SiCl4, metal halides, such as TiCl4, and polyvinylaromatics, such as divinylbenzenes. Further details of the preparation of these polymers are to be found in, for example, DE-A 26 10 068.

It is also possible to use mixtures of at least two of the polymers previously stated for C as component C. In one embodiment of the invention, the composition contains only components A, B and D.

In addition to the elastomer component A and polymers B and C, the molding materials prepared by the novel process may contain, as further component D, one or more additives, for example waxes, plasticizers, lubricants and mold release agents, pigments, dyes, dulling agents, flameproofing agents, antioxidants, light stabilizers and heat stabilizers, fibrous and pulverulent fillers and reinforcing agents and antistatic agents in the usual amounts for these agents.

The additives D may be present in pure form and in the solid, liquid or gaseous state or may be used as a mixture of the pure substances with one another. They may also be used in a formulation which facilitates metering, for example as a solution or as a dispersion (emulsion or suspension). A composition or formulation, in the form of a master-batch, i.e. a concentrated mixture with a thermoplastic polymer compatible with the extruder content, is also suitable and is preferred in many cases.

The polymers C and the additives D can be fed to the extruder in one or more of the stated extruder sections. In a preferred embodiment, the components C and D are introduced into the extruder—separately from the elastomer component A and the thermoplastic polymer B—in vent section VeS, in metering section MS and/or in feed section FS in which the polymer is fed to the extruder. In a further preferred embodiment, the components C and/or D are fed to the extruder in a further section FxS.

The components C and D can be metered into the same section or sections or each into different extruder sections, and both 100% of C and 100% of D may be fed to the extruder in one section or distributed over a plurality of sections.

The exact embodiment of the feed of C and D depends on the stated physical and chemical properties of the components A to D and on their ratios. For example, it is possible for additives D having low heat resistance not to be fed to the extruder until the discharge zone ZZ, with the result that thermal degradation of the substances D is substantially prevented.

The invention also relates to a thermoplastic composition prepared by a process as described above and to the use of the thermoplastic composition prepared by a process as described for the production of films, fibers and moldings.

The thermoplastic molding materials prepared by the process can be processed by the generally conventional methods to give moldings. Examples are extrusion (for pipes, profiles, fibers, films and sheets), injection molding (for shaped articles of all kinds) and calendering and rolling (for sheets and films).

An important advantage of the novel process is that a considerable part of the residual water which is present in the partially dewatered elastomer component A is mechanically removed as early as the squeeze zones, so that less thermal energy need be used in the downstream extruder sections for evaporating the remaining water. A substantial energy saving can be observed.

A further advantage of the novel process is that the extruder can be operated at low temperatures than, for example, in the process described in EP-A 534 235, so that the elastomer component A and the polymers consisting of the components A, B, C and D are processed in a gentler manner. Furthermore it is generally possible to dispense with pressure-generating screw elements in the devolatilization part VS, which subject the polymer to considerable thermal and mechanical stress.

In addition, the thermoplastic molding material provided by the process according to the invention enables the preparation of moldings which possess an improved smooth surface. Visible specks in the surface of the moldings due to a remaining salt content in final thermoplastic polymer composition, resulting from the precipitation of the elastomer component, can be widely avoided. By means of the novel process thermoplastic compositions with less than 0.25%, preferable less than 0.1% by weight of salts and particularly preferable less than 0.1% by weight of magnesium sulfate in the final dry product can be obtained.

By incorporating a partially dewatered elastomer component A into the melt of a thermoplastic polymer B and mixing in further polymers C and additives D, it is possible to prepare rubber-modified thermoplastic molding materials of very different types and containing very different additives with a high throughput in a single process step, assuming compatibility or at least partial compatibility of the elastomer component with the other components and sufficient heat stability. In particular, a very wide range of polymer blends can be prepared by mixing in further polymers C. Because the process makes it possible to feed the polymer B to the extruder at either one or more points, the product properties can be changed advantageously.

A BRIEF DESCRIPTION OF THE DRAWING

The invention is illustrated below by the figure which shows a flow diagram of the process unit according to the invention which comprises:
- a precipitation step (I),
- a sintering step (II),
- a partial dewatering step (III),
- a washing step (IV),
- and a step (V) of mechanical dewatering in an extruder.

Figure 1:
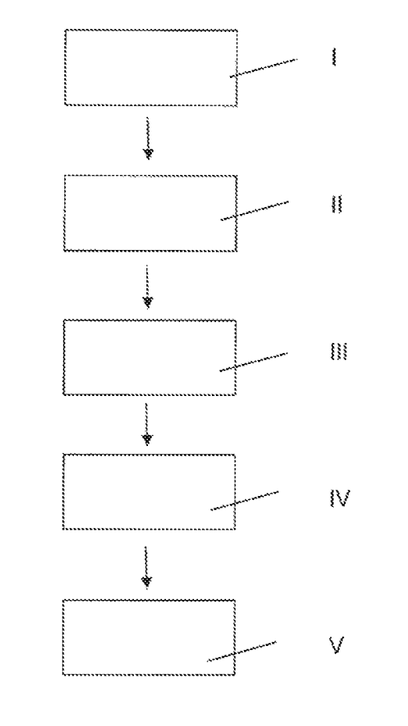

In the precipitation step (I) the elastomer component A is precipitated in an aqueous precipitation step with less than 5.0%, preferred less than 4.0% and more preferred less than 3.5% by weight of a salt, relating to the weight of the dry elastomer component A in the aqueous composition. The precipitation step (I) can be in one, or consist of two, three or more subsequent or parallel precipitation steps.

For example, in a preferred embodiment, a first precipitation step is used, using one or more precipitation agents (e.g. magnesium sulfate (either anhydrous or with crystal water), aluminium sulfate (either anhydrous or with crystal water), calcium chloride, magnesium chloride, magnesium hydroxide, but also sulphuric acid, alone or in combination of sulphuric acid with salts), followed by one or more further precipitation steps where the single steps differ in at least one of the following parameters: amount of precipitation salt and/or acid, pH value, temperature, concentration of salt and/or acid, residence time, vessel size, pressure, stirrer speed, stirrer type.

In the subsequent sintering step (II) or steps, the precipitated rubber is agglomerated to larger particles, which are suitable for further processing. The sintering step (II) typically works at pressures above atmospheric pressure, at temperatures below 125° C., preferred below 120° C., especially preferred below 115° C. and in a most preferred embodiment at 110° C. or below, whereas the temperature shall not be lower than 100° C. After the sintering step II the sintered rubber is treated in a further step (III) to remove some of the water. All technically suitable procedures can be used here, such as partial drying or centrifugation. Preferably, one or more centrifugation steps are used.

In a preferred embodiment, the component A is washed with water after the sintering step (II) and during and/or after the centrifugation step, whereas the amount of washing water is >1%, preferred >5%, especially preferred >10% based on total 100% dry component A. In the mechanical dewatering step V the components A, B and, if present, C and D are fed into an extruder, which is essentially composed of at least one metering section MS, at least one squeeze section SS, least one feed section FS, at least one plastication section PS, at least one last devolatilization section VS and a discharge zone ZZ.

The following examples and claims further describe the invention.

EXAMPLES a) Extruder Configuration

A twin-screw extruder of the type ZSK133 from Coperion, Stuttgart, was used, said extruder consisting of 15 sections. Their arrangement in the downstream direction was as follows:

Section 1 (VeS): 520 mm (Length 4D), unheated, with metering orifice at the top, which is provided with metering via a conveying screw for elastomer component A.

Section 2 (MS): 520 mm (Length 4D), unheated, without orifices and with conveying screw.

Section 3 (SS): 520 mm (Length 4D), unheated, with dewatering orifice on the top (bore in the extruder barrel in the form of a horizontal figure eight with its longitudinal axis in the conveying direction), which is provided with a retaining and conveying screw for squeezing out water from the elastomer. Extruder contains kneading blocks.

Section 4 (MS'): 260 mm (Length 2D), unheated, without orifices and with conveying screw.

Section 5 (SS'): 520 mm (Length 4D), unheated, with dewatering orifice on the top (bore in the extruder barrel in the form of a horizontal figure eight with its longitudinal axis in the conveying direction), which is provided with a retaining and conveying screw for squeezing out water from the elastomer. Extruder contains kneading elements.

Section 6 (SS"): 520 mm (Length 4D), unheated, Fuji plate filters on the size for squeezing out water from the elastomer with conveying elements.

Section 7 (FS): 520 mm (Length 4D), heated, with orifice at the top through which the melt of polymer B is introduced with kneading elements.

Section 8 (MS"): 520 mm (Length 4D), heated, without orifices and with kneading and conveying screw.

Section 9 (VS): 520 mm (Length 4D), heated, with devolatilization orifice at the top and conveying screw, devolatilization is operated under atmospheric pressure (first (atmospheric) devolatilization).

Section 10 (FS'): 520 mm (Length 4D), heated, with orifice at the top through which a second dosing of the melt of polymer B is introduced.

Section 11 (VS'): 520 mm (Length 4D), heated, with devolatilization orifice at the top and conveying screw, devolatilization is operated under 400-700 mbar (second (vacuum) devolatilization).

Section 12 (FxS): 520 mm (Length 4D), Heated, with lateral orifice through which melt of rework and additives are introduced via a ZSK70 side extruder (from Coperion). Contains conveying and kneading blocks.

Sections 13-15 (ZZ): 520 mm (Length 4D), heated, without orifices and with conveying screw (discharge)

Termination: Die head with cylindrical holes for underwater pelletizing.

The screw diameter is Ds=133 mm. The screw is deep-flighted (large flight depth) and the flight depth ratio Ds, external /Ds, internal is 1.55. The screw has a two-flight design.

Polymer Components Used

The following graft rubbers were used as elastomer component A:

A: Graft Polymer Based on Butadiene, Grafted with SAN

Butadiene was polymerized in emulsion, the latex obtained was agglomerated, a latex having an average particle size d50 of 238 nm being formed, and graft polymerization was then effected with a mixture of styrene and acrylonitrile. Further details are given in German Published Application DE-A 2,427,960, column 6, line 17 to column 7, line 27. The graft polymer is precipitated, sintered and washed as outlined in table.

B: Styrene/Acrylonitrile Copolymer

A SAN-copolymer with 75% by weight of styrene and 25% by weight of acrylonitrile was prepared by the continuous solution polymerization method, as described in Kunststoff-Handbuch, Editors Vieweg and Daumiller, Vol. V "Polystyrol", Hanser-Verlag Munich 1969, pages 122-124. The viscosity number VN (determined according to DIN 53726 at 25° C., 0.5% strength by weight in dimethylformamide) was 64 ml/g.

Processing Steps:

A mixture of 46% component A and 54% component B relating to the dry weight of the mixture was compounded under aforementioned conditions at melt temperatures of 220-260° C., extruded as pellets in underwater granulation, dried 4 hours at 80° C. in a hot oven or dryer and then molded into 60×60 mm^2 and 4 mm thick plaques and subsequently stored 3 days in deionized water at 23° C. Subsequently, the plaques were taken out of the water, remaining water droplets wiped off and the plaques put into a heated vacuum oven at 100° C. for 1 hour.

TABLE

| Sample no | Precipitated with | Precipitate concentration in 20 wt % elastomer suspension | Sintering at (° C.) | Sintering time (min) | Washing water | Score points |
| --- | --- | --- | --- | --- | --- | --- |
| 1 (Comparison) | MgSO$_4$ | 0.8% | 124 | 40 | No | 1 |
| 2 | MgSO$_4$ | 0.7% | 124 | 40 | No | 1 |
| 3 | MgSO$_4$ | 0.6% | 124 | 40 | No | 1-2 |
| 4 | MgSO$_4$ | 0.6% | 120 | 40 | No | 1-2 |
| 5 | MgSO$_4$ | 0.6% | 116 | 40 | No | 2 |
| 6 | MgSO$_4$ | 0.6% | 110 | 40 | No | 2-3 |
| 7 | MgSO$_4$ | 0.6% | 108 | 40 | No | 2-3 |
| 8 | MgSO$_4$ | 0.6% | 108 | 40 | 300 l/h | 2-3 |
| 9 | MgSO$_4$ | 0.6% | 108 | 40 | 600 l/h | 2-3 |
| 10 | MgSO$_4$ | 0.6% | 108 | 40 | 900 l/h | 3 |
| 11 | MgSO$_4$ | 0.6% | 108 | 40 | 2000 l/h | 3 |

The visibility of specks on the surface of the plaques, being stored in a heated vacuum oven at 100° C. for 1 hour, were assessed independently by 5 different persons, using following score points:

1 point: very rough and uneven surface
2 points: rough surface
3 points: smooth surface, specks hardly visible
4 points: perfectly smooth surface.

The magnesium content in the final product is reduced from ca. 0.6% to 0.3% by weight with reduced MgSO$_4$ from 0.7 to 0.6 wt % per dry weight elastomer in the precipitation stage at lower sintering temperatures from 124 to 108° C., and at higher washing rates. The salt specs are reduced by a factor between 2 and 3.

The invention claimed is:

1. A process for preparing a thermoplastic polymer composition or a thermoplastic polymer blend, comprising:
    A) from 20 to 80% by weight of at least one water-moist elastomer component A containing up to 40% by weight of residual water
    B) from 20 to 80% by weight of at least one thermoplastic polymer B,
    C) from 0 to 40% by weight of at least one further polymer C, and
    D) from 0 to 60% by weight of at least one additive D,
by mixing the elastomer component A with the thermoplastic polymer B and, if present, the further polymer C and, if present, the at least one additive D in an extruder, comprising the steps of:
    a) precipitating the elastomer component A, separately or together with parts of one or several other components, in an aqueous precipitation step (I), wherein the aqueous composition used for precipitation contains less than 5.0% by weight, relating to the weight of the dry elastomer component A, of a salt,
    b) mechanical dewatering of the elastomer component A in one or more dewatering steps (V),
    wherein the components A, B and, if present, C and D are fed into an extruder, which has at least two screws rotating in the same direction or in opposite directions and having a screw diameter Ds, and, in the conveying direction, the extruder is essentially composed of:
        at least one metering section MS into which elastomer component A is fed to the extruder by a metering device,
        at least one squeeze section SS which serves for dewatering the elastomer component A and contains at least a first retarding element and at least one dewatering orifice which is present upstream of the first retarding element,
        at least one feed section FS in which the thermoplastic polymer B is introduced as a melt into the extruder,
        at least one plastication section PS provided with mixing or kneading elements,
        at least one last devolatilization section VS which is provided with at least one devolatilization orifice and in which the remaining water is removed as steam, and a discharge zone ZZ, wherein the components C and/or D, if present, are fed to the extruder together or separately from one another wherein the aqueous precipitation step (I) is directly or indirectly followed by a sintering step (II), wherein the precipitated component A is agglomerated to a larger particle size, characterized by using a temperature from 100° to 125° C.

and wherein the elastomer component A is washed, directly or indirectly after the sintering step (II), with an amount of water which corresponds to 10 to 50% by weight of water, relating to the dry weight of the elastomer component A.

2. A process as claimed in claim 1, wherein the elastomer component A is precipitated, separately from the other components, in an aqueous precipitation step (I), using an aqueous precipitation composition containing less than 3.5% by weight of a salt, relating to the dry weight of the elastomer component A.

3. A process as claimed in claim 1, wherein the sintering step (II) is characterized by using a temperature from 100° to 115° C.

4. A process as claimed in claim 1, wherein the sintering step (II) is effectuated at a pressure above atmospheric pressure.

5. A process as claimed in claim 1, wherein the salt used for the precipitation step (I) is chosen from the group consisting of anhydrous magnesium sulfate, magnesium sulfate with crystal water, anhydrous aluminum sulfate, aluminum sulfate with crystal water, calcium chloride, magnesium chloride, magnesium hydroxide, and a bi-valent salt or a tri-valent salt of sulphuric acid, and combinations thereof.

6. A process as claimed in claim 1, wherein sulphuric acid is used for the precipitation step (I).

7. A process as claimed in claim 1, wherein the precipitation step (I) comprises more than one subsequent steps, which differ in at least one of the parameters chosen from the group consisting of: salt used for the precipitation, amount of salt and/or acid used for the precipitation, pH-value, temperature, concentration of salt and/or acid used for the precipitation, residence time, vessel size, pressure, stirrer speed, and stirrer type.

8. A process as claimed in claim 1, wherein at least a part of the water emerging from the dewatering orifices is present in the liquid phase.

9. A process as claimed in claim 1, wherein the screw elements of the extruder have a flight depth ratio $DS_{external}/DS_{internal}$ of from 1.2 to 1.8 and contain 3-flight and 2-flight high volume elements.

\* \* \* \* \*